H. MONROE.
GRAIN DRYING AND STERILIZING DEVICE.
APPLICATION FILED OCT. 31, 1914.
1,168,667.  Patented Jan. 18, 1916.
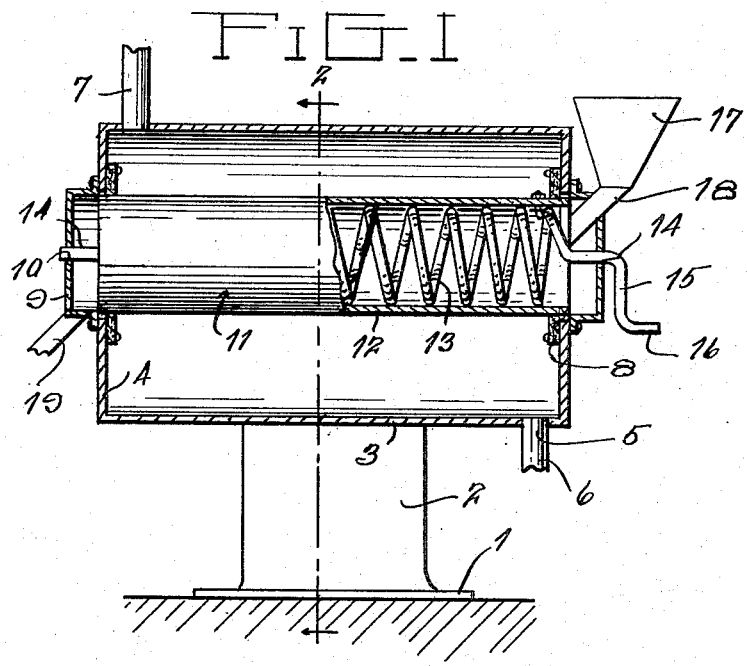
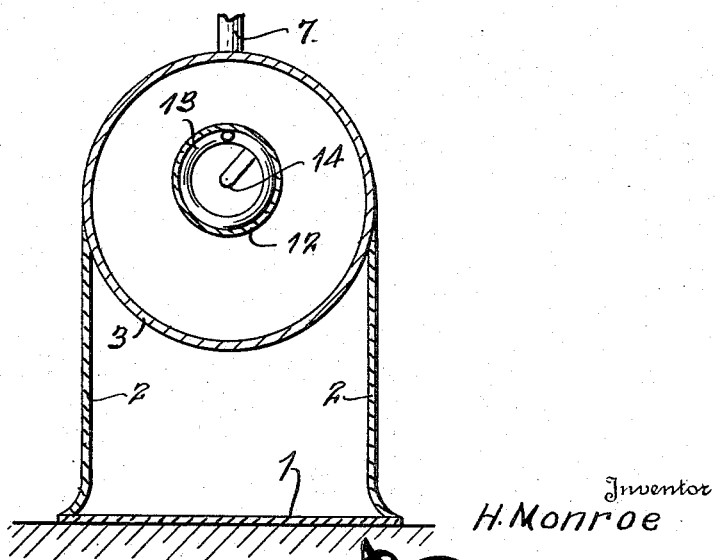
Witnesses
Chas. H. Trotter.
J. F. Byrne
Inventor
H. Monroe
By
Attorney

UNITED STATES PATENT OFFICE.

HENRY MONROE, OF SABETHA, KANSAS.

GRAIN DRYING AND STERILIZING DEVICE.

1,168,667. Specification of Letters Patent. Patented Jan. 18, 1916.

Application filed October 31, 1914. Serial No. 869,605.

*To all whom it may concern:*

Be it known that I, HENRY MONROE, a citizen of the United States, residing at Sabetha, in the county of Nemaha and State of Kansas, have invented certain new and useful Improvements in Grain Drying and Sterilizing Devices; and I do hereby declare the following to be a full, clear, and exact description of the invention, such as will enable others skilled in the art to which it appertains to make and use the same.

This invention relates to new and useful improvements in grain drying and sterilizing devices, and has for its principal object to provide a device which will effectively remove moisture from grains, cereals and similar materials.

Another object of the invention is to provide a device by which the grain is heated to prevent insects from inhabiting the same.

With these and other objects in view, the invention consists in the novel combination and arrangement of parts which will be fully set forth in the following specification and accompanying drawings, in which, Figure 1 is a longitudinal, sectional view of a drier constructed in accordance with this invention, the inner drum thereof being partly in section to illustrate the details of construction, and, Fig. 2 is a transverse sectional view taken on line 2—2 of Fig. 1.

Referring now to the drawings by characters of reference, the numeral 1 designates the base of the device which is provided with a pair of uprights 2, which uprights are secured to the outer drum 3 at diametrically opposite points. This outer drum is provided with the ends 4 and apertures 5, which apertures are arranged to receive the steam pipes 6 and 7 which are arranged to keep up the circulation of steam through the outer drum. An enlarged aperture 8 is formed in each of the ends 4 eccentrically with relation to the diameter of said drum, and these apertures are covered by the brackets and plates 9 having the central apertures 10 which form the journal bearings for the inner drum as will be more fully hereinafter described.

The inner drum above referred to, is designated by the numeral 11 and comprises the outer shell 12, which is supported on a coil of wire or similar material designated by the numeral 13. This coil terminates at each end in the trunnion 14 which projects through each of the apertures 10 and thereby rotatably holds the drum 11 in place. An angular extension 15 is formed on one of the trunnions 14 and this extension terminates in the handle portion 16 and forms a crank by which the inner drum may be rotated.

A suitable hopper 17 is supported on one end of the device and communicates with the inner drum by means of the conveyer tube 18, while the opposite end is provided with a suitable conveyer tube 19 for conveying the dried material from the drum.

It will be apparent from the foregoing that in use the steam or other heating influence is passed through the drum 3 and around the inner drum 11, which will cause the inner drum to be heated and upon feeding the material which is to be dried from the hopper 17 through the pipe 18 and into the inner drum, it will be apparent that the same will be passed along the inner drum by means of the wire coil 13 which also forms a support for the drum, and thence outwardly through the tube 19 into any desired receptacle. During the process, it will be apparent that the coil 13 not only acts as a support for the inner drum, but also provides an agitator which will keep the material within the drum in constant motion, and thereby prevent any danger of burning or sticking to the sides.

While in the foregoing there has been shown and described the preferred embodiment of this invention, it is to be understood that such changes may be made in the combination and arrangement of parts as will fall within the spirit and scope of the invention as defined in the appended claims.

What is claimed is:

1. A drier comprising an outer drum, an inner drum rotatably mounted within the outer drum, a coil within the inner drum, extensions on the coil journaled in the ends of the outer drum and a crank at the outer end of one of the extensions to provide a means for rotating the inner drum.

2. A drier and sterilizer comprising an outer cylindrical drum, an inner cylindrical drum rotatably mounted in the outer drum, a coil extending longitudinally through the inner drum, and forming a support therefor, the ends of the coil being journaled in the ends of the outer drum, the said coil also forming an agitator to keep the material which is being dried or sterilized in constant motion, and a crank formed at one end of the coil to provide a means for rotation of the inner drum.

In testimony whereof I affix my signature in presence of two witnesses.

HENRY MONROE.

Witnesses:
F. McLaughlin,
Frank N. Morrill.

Copies of this patent may be obtained for five cents each, by addressing the "Commissioner of Patents, Washington, D. C."